United States Patent
Wang et al.

(10) Patent No.: US 10,594,919 B2
(45) Date of Patent: Mar. 17, 2020

(54) CAMERA DEVICE AND METHOD FOR CAPTURING IMAGES BY USING THE SAME

(71) Applicants: BOE TECHNOLOGY GROUP CO., LTD., Beijing (CN); ORDOS YUANSHENG OPTOELECTRONICS CO., LTD., Inner Mongolia (CN)

(72) Inventors: Huijuan Wang, Beijing (CN); Xue Dong, Beijing (CN); Dan Wang, Beijing (CN); Yun Qiu, Beijing (CN); Xiao Sun, Beijing (CN); Zhaokun Yang, Beijing (CN); Ruiyong Wang, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 153 days.

(21) Appl. No.: 15/542,374

(22) PCT Filed: Feb. 15, 2017

(86) PCT No.: PCT/CN2017/073660
§ 371 (c)(1),
(2) Date: Jul. 7, 2017

(87) PCT Pub. No.: WO2017/202065
PCT Pub. Date: Nov. 30, 2017

(65) Prior Publication Data
US 2018/0220057 A1    Aug. 2, 2018

(30) Foreign Application Priority Data
May 25, 2016    (CN) .......................... 2016 1 0353752

(51) Int. Cl.
*H04N 5/232*    (2006.01)
*H04N 5/225*    (2006.01)
(Continued)

(52) U.S. Cl.
CPC ........... *H04N 5/23212* (2013.01); *G02F 1/29* (2013.01); *H04N 5/2254* (2013.01);
(Continued)

(58) Field of Classification Search
CPC .................. H04N 5/23212; H04N 5/3572
See application file for complete search history.

(56) References Cited

U.S. PATENT DOCUMENTS 5,517,279 A * 5/1996 Hugle .................. G02B 3/0056
355/46
2011/0176020 A1 7/2011 Chang
(Continued)

FOREIGN PATENT DOCUMENTS

| CN | 101630105 A | 1/2010 |
|---|---|---|
| CN | 102131044 A | 7/2011 |

(Continued)

OTHER PUBLICATIONS

International Search Report for PCT Application No. PCT/CN2017/073660 dated Mar. 31, 2017.
(Continued)

*Primary Examiner* — Christopher K Peterson
(74) *Attorney, Agent, or Firm* — Calfee, Halter & Griswold LLP

(57) ABSTRACT

This disclosure relates to a camera device and a method for capturing images by using the same. The camera device includes a liquid crystal lens array composed of a plurality of liquid crystal sub-lenses, an image sensor and a drive module. A preset distance is provided between the liquid crystal lens array and the image sensor, and the drive module
(Continued)

is electrically connected with the liquid crystal lens array. The drive module is configured to adjust a focus of each liquid crystal sub-lens during capturing based on a distance between an object to be captured and a corresponding liquid crystal sub-lens, such that light rays from each object are focused respectively in a plane where the image sensor is located after passing through the corresponding liquid crystal sub-lens.

20 Claims, 2 Drawing Sheets

(51) Int. Cl.
*H04N 5/357* (2011.01)
*G02F 1/29* (2006.01)

(52) U.S. Cl.
CPC ... *H04N 5/22541* (2018.08); *H04N 5/232125* (2018.08); *H04N 5/232133* (2018.08); *H04N 5/3572* (2013.01)

(56) References Cited

U.S. PATENT DOCUMENTS

| | | | |
|---|---|---|---|
| 2012/0026297 A1* | 2/2012 | Sato | G03B 35/08 |
| | | | 348/47 |
| 2014/0016015 A1 | 1/2014 | Miao | |
| 2015/0070607 A1* | 3/2015 | Usukura | G02B 3/0081 |
| | | | 349/15 |

FOREIGN PATENT DOCUMENTS

| | | |
|---|---|---|
| CN | 103076706 A | 5/2013 |
| CN | 104345423 A | 2/2015 |
| CN | 104423116 A | 3/2015 |
| CN | 104717482 A | 6/2015 |
| CN | 105827922 A | 8/2016 |
| JP | 2006251613 A | 9/2006 |

OTHER PUBLICATIONS

First Office Action for Chinese Patent Application No. 201610353752.5 dated Apr. 19, 2018.

* cited by examiner

CAMERA DEVICE AND METHOD FOR CAPTURING IMAGES BY USING THE SAME

RELATED APPLICATION

The present application is the U.S. national phase entry of PCT/CN2017/073660, with an international filling date of Feb. 15, 2017, which claims the benefit of Chinese patent application No. 201610353752.5 filed on May 25, 2016, the entire disclosures of which are incorporated herein by reference.

FIELD

This disclosure relates to the field of imaging technologies, and in particular to a camera device and a method for capturing images by using the same.

BACKGROUND ART

In modern days, people are increasingly fond of recording their life by taking photos. Thus, photography has drawn an increasing amount of attention, whether the photos are taken as an occupation or as an interest. People often encounter two kinds of problems when they take photos with a camera. On one hand, in order to highlight characteristics or achieve a special effect, people usually bring a target object in focus while blurring its surrounding background. On the other hand, when photographing themes such as a scenery, a flower or a building, people always hope to exhibit all elements in the entire picture, i.e., to obtain a photo with all depth of field. This requires each point of the shot to be accurately focused. However, for an ordinary camera, once the photographing process is over, the focus can no longer be changed in the post-processing of a photo, which restricts flexibility in post-processing the photo.

A light field camera is usually adopted for taking photos so as to deal with the above two kinds of problems. Alternatively, photos of a same scene can be taken manually with different focuses and then combined into a photo with all depth of field by means of image processing software.

However, an imaging portion of a light field camera is generally composed of a microlens array and an image sensor array. Such a lens array is usually composed of thousands of microlenses. With such a light field camera, a light field of incident light beams can be recorded. After that, images are decoded through complicated physical and mathematical computation by using software, and thereby processed into final images. The microlens array of the light field camera is formed by arranging conventional microlenses. However, the conventional lenses cannot implement a rapid and flexible zooming function. Therefore, the technical solution, which acquires images with different focuses by means of a light field camera, cannot be achieved without complicated physical and mathematical knowledge. These complicated techniques are not favorable for the market popularization of a light field camera. Correspondingly, the method, which combines manual photography with image processing software to create a photo with all depth of field, involves a complex procedure and requires high photography techniques of a photographer. Specifically, the photographer may need to manually control the uniformity of an exposure level, ensure an optimal aperture or even resort to things like a tripod to ensure stability of the camera.

SUMMARY

Embodiments of this disclosure provide a camera device and a method for capturing images using the same. Such a camera device has advantages like a simple structure, fast capturing and convenience of operation. Moreover, this camera device can also be used for capturing images with all depth of field.

According to a first aspect of this disclosure, a camera device is provided. The camera device comprises: a liquid crystal lens array composed of a plurality of liquid crystal sub-lenses, an image sensor and a drive module. Specifically, a preset distance is provided between the liquid crystal lens array and the image sensor, and the drive module is electrically connected with the liquid crystal lens array. Further specifically, the drive module is configured to adjust a focus of each liquid crystal sub-lens during capturing based on a distance between an object to be captured and a corresponding liquid crystal sub-lens, such that light rays from each object are focused respectively in a plane where the image sensor is located after passing through the corresponding liquid crystal sub-lens.

According to a possible implementation, in the camera device provided in an embodiment of this disclosure, the liquid crystal lens array comprises: a first substrate and a second substrate arranged oppositely. Specifically, each liquid crystal sub-lens comprises: a first transparent electrode arranged on a side of the first substrate facing the second substrate, a second transparent electrode arranged on a side of the second substrate facing the first substrate, and a liquid crystal layer located between the first transparent electrode and the second transparent electrode.

According to a possible implementation, in the camera device provided in an embodiment of this disclosure, the first transparent electrode is a planar electrode, and the second transparent electrode comprises a plurality of sub-electrodes arranged side by side. Alternatively, the second transparent electrode is a planar electrode, and the first transparent electrode comprises a plurality of sub-electrodes arranged side by side.

According to a possible implementation, in the camera device provided in an embodiment of this disclosure, the sub-electrode comprises a linear sub-electrode or a dot sub-electrode.

According to a possible implementation, in the camera device provided in an embodiment of this disclosure, the first transparent electrode and the second transparent electrode are both indium-tin oxide semiconductor transparent electrodes.

According to a possible implementation, in the camera device provided in an embodiment of this disclosure, an area occupied by each liquid crystal sub-lens in the liquid crystal lens array is the same.

According to a possible implementation, in the camera device provided in an embodiment of this disclosure, the image sensor comprises an image sensor array composed of a plurality of sub-sensors, and each liquid crystal sub-lens correspond to at least one sub-sensor.

According to a possible implementation, the camera device provided in an embodiment of this disclosure further comprises: an aberration correction optical system arranged in an optical path from the liquid crystal lens array to the image sensor.

According to a possible implementation, in the camera device provided in an embodiment of this disclosure, the aberration correction optical system comprises a Fresnel lens group.

According to a second aspect of this disclosure, a method for capturing images by using any camera device mentioned above is provided. Specifically, such a capturing method comprises: during capturing, adjusting, by the drive module, a focus of each liquid crystal sub-lens based on a distance between an object to be captured and a corresponding liquid crystal sub-lens, such that light rays from each object are focused respectively in a plane where the image sensor is located after passing through the corresponding liquid crystal sub-lens.

DETAILED DESCRIPTION OF EMBODIMENTS

Figure 1:
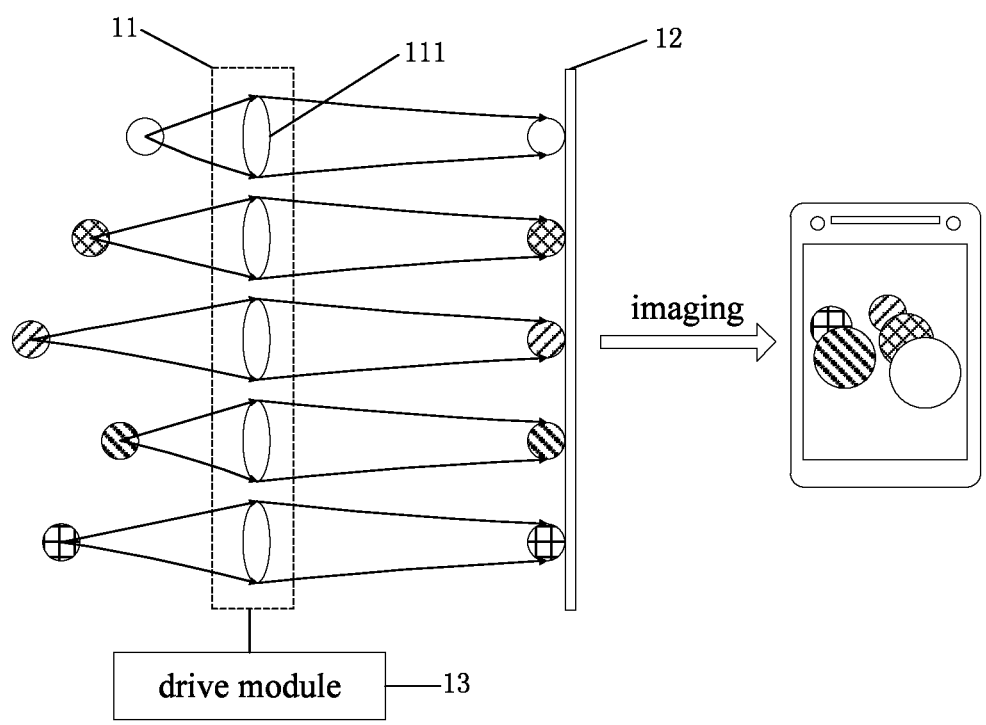
FIG. 1 shows a schematic structure view of a camera device according to an embodiment of this disclosure.

To deal with problems such as complicated structure and complex capturing procedure in a current camera device with all depth of field, embodiments of this disclosure provide a camera device. As shown in FIG. 1, a camera device according to this disclosure can comprise: a liquid crystal lens array 11 composed of a plurality of liquid crystal sub-lenses 111, an image sensor 12 and a drive module 13. Specifically, a preset distance can be provided between the liquid crystal lens array 11 and the image sensor 12. The drive module 13 can be electrically connected with the liquid crystal lens array 11. Furthermore, the drive module 13 can be configured to adjust a focus of each liquid crystal sub-lens 111 during capturing based on a distance between an object to be captured and a corresponding liquid crystal sub-lens 111. In this way, light rays from each object are focused respectively in a plane where the image sensor 12 is located after passing through the corresponding liquid crystal sub-lens 111.

In a specific embodiment, the plane where the liquid crystal lens array 11 is located and the plane where the image sensor 12 is located can be usually arranged to be parallel, so as to simplify an imaging optical path of the liquid crystal lens. Alternatively, the plane where the liquid crystal lens array 11 is located and the plane where the image sensor 12 is located can also be arranged such that a preset angle is enclosed according actual needs. Obviously, this disclosure is not limited thereto. According to such a specific embodiment, the drive module can adjust a focal length of each liquid crystal sub-lens based on a distance between an object to be captured and each liquid crystal sub-lens, such that different portions of the liquid crystal lens array have different focal lengths. In this way, objects to be captured that are located at different distances can be brought in focus on the image sensor, and thereby an image with all depth of field can be obtained. As compared with an existing camera device with all depth of field, the camera device according to embodiments of this disclosure has advantages such as a simple structure, a fast response speed, convenience of operation and no post-processing.

Figure 2:
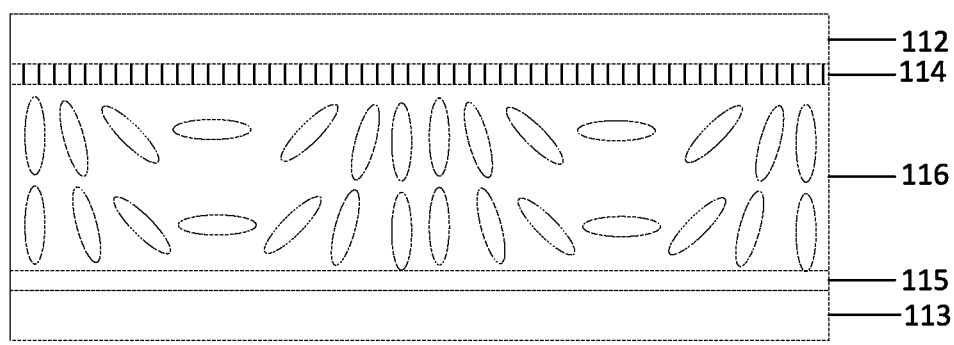
FIG. 2 shows a schematic structure view of a liquid crystal lens array in a camera device according to an embodiment of this disclosure.

According to a specific embodiment, in the camera device provided in an embodiment of this disclosure, as shown in FIG. 2, the liquid crystal lens array 11 can comprise: a first substrate 112 and a second substrate 113 arranged oppositely. Furthermore, each liquid crystal sub-lens 111 can further comprise: a first transparent electrode 114 arranged on a side of the first substrate 112 facing the second substrate 113, a second transparent electrode 115 arranged on a side of the second substrate 113 facing the first substrate 112, as well as a liquid crystal layer 116 located between the first transparent electrode 114 and the second transparent electrode 115. Since it is required for the liquid crystal lens array 11 to converge light rays reflected from the object to be captured, the first substrate 112 and the second substrate 113 of the liquid crystal lens array 11 can be made of a light transmitting material. For example, the first substrate 112 and the second substrate 113 can be glass substrates. In actual applications, the first substrate 112 and the second substrate 113 can also be made of other light transmitting materials, which will not be limited here. As a further optional example, the liquid crystal lens array 11 can be composed of liquid crystal sub-lenses 111. In this case, each liquid crystal lens 111 can comprise a first transparent electrode 114, a second transparent electrode 115, and a liquid crystal layer 116 located between the first transparent electrode 114 and the second transparent electrode 115. In actual applications, a drive signal is applied by the drive module to the first transparent electrode 114 and the second transparent electrode 115 of each liquid crystal sub-lens 111, so as to deflect liquid crystal molecules located between the first transparent electrode 114 and the second transparent electrode 115. In this way, a curvature of each liquid crystal sub-lens 111 will change, which results in different focal lengths. As can be seen, the camera device according to embodiments of this disclosure can clearly image objects located in different positions at the same time, and thus obtain an image with all depth of field.

According to a specific embodiment, in the camera device provided in an embodiment of this disclosure, the first transparent electrode 114 can be selected as a planar electrode, and the second transparent electrode 115 can comprise a plurality of sub-electrodes arranged side by side. Alternatively, as another solution, the second transparent electrode 115 can be selected as a planar electrode, and the first transparent electrode 114 can comprise a plurality of sub-electrodes arranged side by side. In a specific embodiment, the plurality of sub-electrodes corresponds to a liquid crystal sub-lens. Therefore, when the drive module applies a drive signal to the plurality of sub-electrodes of the first transparent electrode 114 or the second transparent electrode 115, a curvature of the corresponding liquid crystal sub-lens will change, and thereby a focusing effect can be adjusted.

Furthermore, in the camera device provided in an embodiment of this disclosure, the sub-electrode can comprise a linear sub-electrode. Alternatively, the sub-electrode can also comprise a dot sub-electrode. In a specific embodiment, the dot sub-electrode can further be a dot sub-electrode having a regular shape. For example, a circular dot sub-electrode or a square dot sub-electrode can be used. Obviously, the dot sub-electrode can further be selected as a dot sub-electrode having an irregular shape, which will not be limited here. Besides, the sub-electrodes can be further designed to be sub-electrodes in a circular array, an annular array or a rectangular array upon actual needs, which will not be specifically limited in this embodiment.

According to a specific embodiment, in the camera device provided in an embodiment of this disclosure, the first transparent electrode 114 and the second transparent electrode 115 are both semiconductor transparent electrodes made of indium-tin oxide. In actual applications, the first transparent electrode 114 and the second transparent electrode 115 can also be made of other transparent electrode materials, so as to increase transmittance of the liquid crystal lens array 11, which will not be limited here.

According to a specific embodiment, in the camera device provided in an embodiment of this disclosure, an area occupied by each liquid crystal sub-lens 111 in the liquid crystal lens array 11 is the same. Each liquid crystal sub-lens 111 occupies a same area in the liquid crystal lens array 11. This facilitates the application of a drive signal to a sub-electrode corresponding to each liquid crystal sub-lens 111. Obviously, in a specific embodiment, the area occupied by each liquid crystal sub-lens 111 may also be different, which will not be limited in this embodiment.

Figure 3:
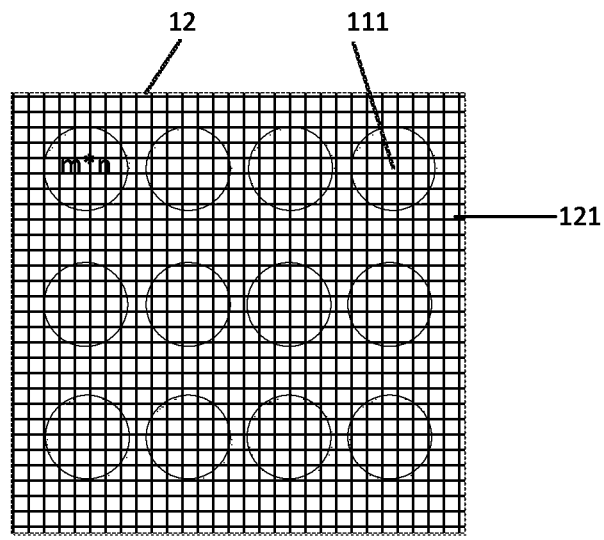
FIG. 3 shows a schematic view reflecting a positional relationship between a liquid crystal sub-lens and an image sensor array in a camera device according to an embodiment of this disclosure.

According to a specific embodiment, in the camera device provided in an embodiment of this disclosure, as shown in FIG. 3, the image sensor 12 can specifically comprise an image sensor array composed of a plurality of sub-sensors 121. Furthermore, each liquid crystal sub-lens 111 can also correspond to at least one sub-sensor 121. In a specific embodiment, each liquid crystal sub-lens 111 can correspond to m×n sub-sensors 121. Further preferably, values of m and n can be taken as m=n, in order to improve the camera effect. Generally, the values of m and n may influence the imaging accuracy. Specifically, the greater values m and n take, the higher the imaging accuracy is. In actual applications, the number of the sub-sensors 121 can be changed upon actual needs, which will not be limited here. Besides, in actual applications, components such as COMS can also be used as the sub-sensors 121 to form an image sensor array.

Figure 4:
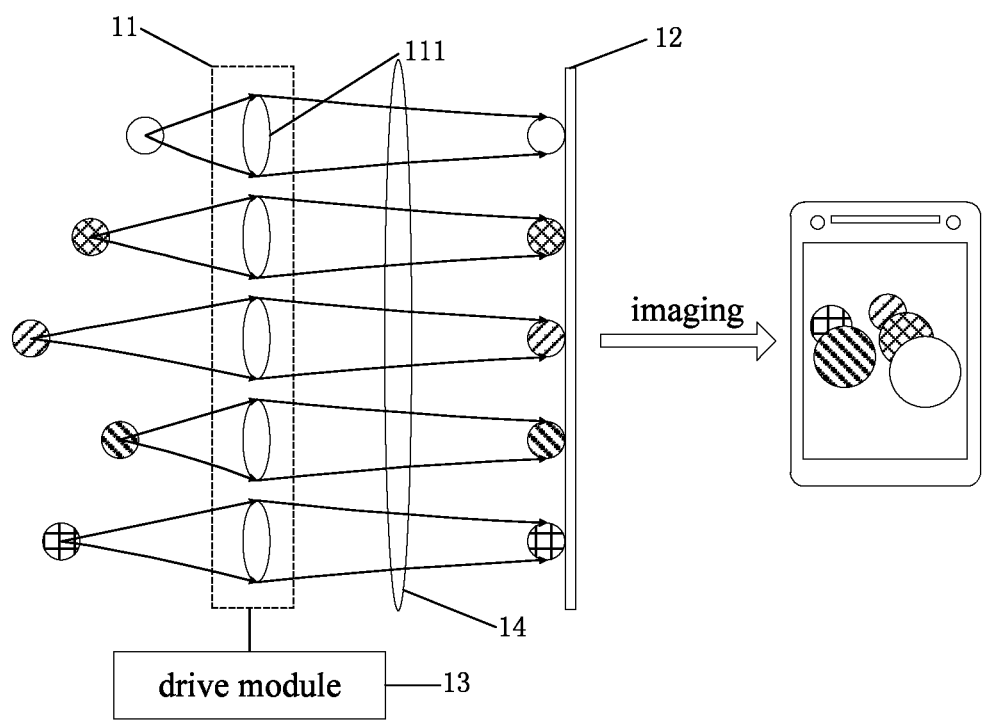
FIG. 4 shows a schematic structure view of a camera device according to another embodiment of this disclosure.

Furthermore, as shown in FIG. 4, the camera device provided in an embodiment of this disclosure can further comprise an aberration correction optical system 14 arranged in an optical path from the liquid crystal lens array 11 to the image sensor 12. With such an aberration correction optical system, the aberration can be reduced, and the camera quality of the camera device can be improved.

According to a specific embodiment, in the camera device provided in an embodiment of this disclosure, the aberration correction optical system 14 can comprise a Fresnel lens group. Other aberration correction means or lenses can also be used to achieve a same effect, which will not be specifically limited in this embodiment.

Based on a same inventive concept, embodiments of this disclosure further provide a method for capturing images by using any camera device as mentioned above. Since the principle for solving technical problems by the method is similar to the camera device as mentioned above, implementations will not be repeated for simplicity.

Specifically, according to an embodiment of this disclosure, the method for capturing images by using any camera device as mentioned above can comprise: during capturing, adjusting, by the drive module, a focus of each liquid crystal sub-lens based on a distance between an object to be captured and a corresponding liquid crystal sub-lens, such that light rays from each object are focused respectively in a plane where the image sensor is located after passing through the corresponding liquid crystal sub-lens.

According to the method for capturing images by using the above camera device provided in an embodiment of this disclosure, the drive module can adjust a focus of each liquid crystal sub-lens based on a distance between each object and a corresponding liquid crystal sub-lens, such that both the foreground and the background being captured can be clearly imaged in the plane where the image sensor is located. Accordingly, a photo with all depth of field can be obtained.

Besides, in the camera device provided in an embodiment of this disclosure, the liquid crystal lens array can be fixedly focused on any focus, thereby blurring the background behind this focus and highlighting an object to be captured. According to a specific embodiment, in the camera device provided in an embodiment of this disclosure, the image sensor can further record two-dimensional information of objects that are located in different positions and captured by a camera lens. Moreover, the drive signal is determined based on a distance between the object and the liquid crystal sub-lens, so as to adjust a focal length of each liquid crystal sub-lens in the liquid crystal lens array. Therefore, a distance between each object to be captured and the camera lens, i.e., the depth-of-field information, can be inferred from each drive signal of the drive module during capturing. In this case, a three-dimensional image can be obtained on a three-dimensional display in combination with the two-dimensional information of each object to be captured.

The embodiments of this disclosure provide a camera device comprising: a liquid crystal lens array composed of a plurality of liquid crystal sub-lenses, an image sensor and a drive module. Specifically, a preset distance is provided between the liquid crystal lens array and the image sensor, and the drive module is electrically connected with the liquid crystal lens array. In the camera device provided in the embodiments of this disclosure, the drive module adjusts a focus of each liquid crystal sub-lens during capturing based on a distance between an object to be captured and a corresponding liquid crystal sub-lens, such that light rays from each object are focused respectively in a plane where the image sensor is located after passing through the corresponding liquid crystal sub-lens. In this way, the drive module adjusts a focal length of each liquid crystal sub-lens, such that different portions of the liquid crystal lens array have different focal lengths. Based on that, objects to be captured that are located at different distances can be brought in focus on the image sensor, and thereby an image with all depth of field can be obtained. As compared with an existing camera device with all depth of field, the camera device according to the embodiments of this disclosure has advantages such as a simple structure, a fast response speed, convenience of operation and no post-processing.

Obviously, those skilled in the art can make various modifications and variations to this disclosure without deviating from spirits and scopes of this disclosure. Thus, if these modifications and variations to this disclosure fall within the scopes of claims in this disclosure and the equivalent techniques thereof, this disclosure is intended to include them too.

The invention claimed is:

1. A camera device, configured to capture images of a plurality of objects to be captured, and comprising:
   a liquid crystal lens array composed of a plurality of liquid crystal sub-lenses;
   an image sensor; and
   a drive module,
   wherein a preset distance is provided between the liquid crystal lens array and the image sensor,
   wherein the drive module is electrically connected with the liquid crystal lens array, and
   wherein the drive module is configured to adjust, based on a distance between each object to be captured and a respective liquid crystal sub-lens, a focus of the liquid crystal sub-lens during capturing, such that light rays from each object to be captured are focused respectively in a plane where the image sensor is located after passing through the respective liquid crystal sub-lens.

2. The camera device according to claim 1, wherein
the liquid crystal lens array comprises: a first substrate and a second substrate arranged oppositely, and
each liquid crystal sub-lens comprises: a first transparent electrode arranged on a side of the first substrate facing the second substrate; a second transparent electrode arranged on a side of the second substrate facing the first substrate; and a liquid crystal layer located between the first transparent electrode and the second transparent electrode.

3. The camera device according to claim 2, wherein
the first transparent electrode comprises a planar electrode, and
the second transparent electrode comprises a plurality of sub-electrodes arranged side by side.

4. The camera device according to claim 3, wherein the sub-electrode comprises a linear sub-electrode or a dot sub-electrode.

5. The camera device according to claim 3, wherein the first transparent electrode and the second transparent electrode are both indium-tin oxide semiconductor transparent electrodes.

6. The camera device according to claim 3, wherein an area occupied by each liquid crystal sub-lens in the liquid crystal lens array is the same.

7. The camera device according to claim 3, wherein
the image sensor comprises an image sensor array composed of a plurality of sub-sensors, and
each liquid crystal sub-lens correspond to at least one sub-sensor.

8. The camera device according to claim 3, further comprising:
an aberration correction optical system arranged in an optical path from the liquid crystal lens array to the image sensor.

9. The camera device according to claim 2, wherein
the second transparent electrode comprises a planar electrode, and
the first transparent electrode comprises a plurality of sub-electrodes arranged side by side.

10. The camera device according to claim 9, wherein the sub-electrode comprises a linear sub-electrode or a dot sub-electrode.

11. The camera device according to claim 2, wherein the first transparent electrode and the second transparent electrode are both indium-tin oxide semiconductor transparent electrodes.

12. The camera device according to claim 2, wherein an area occupied by each liquid crystal sub-lens in the liquid crystal lens array is the same.

13. The camera device according to claim 2, wherein
the image sensor comprises an image sensor array composed of a plurality of sub-sensors, and
each liquid crystal sub-lens correspond to at least one sub-sensor.

14. The camera device according to claim 2, further comprising:
an aberration correction optical system arranged in an optical path from the liquid crystal lens array to the image sensor.

15. The camera device according to claim 14, wherein the aberration correction optical system comprises a Fresnel lens group.

16. The camera device according to claim 1, wherein an area occupied by each liquid crystal sub-lens in the liquid crystal lens array is the same.

17. The camera device according to claim 1, wherein
the image sensor comprises an image sensor array composed of a plurality of sub-sensors, and
each liquid crystal sub-lens correspond to at least one sub-sensor.

18. The camera device according to claim 1, further comprising:
an aberration correction optical system arranged in an optical path from the liquid crystal lens array to the image sensor.

19. The camera device according to claim 18, wherein the aberration correction optical system comprises a Fresnel lens group.

20. A method for capturing images by a camera device, wherein the camera device is configured to capture images of a plurality of objects to be captured and comprises:
a liquid crystal lens array composed of a plurality of liquid crystal sub-lenses;
an image sensor; and
a drive module,
wherein a preset distance is provided between the liquid crystal lens array and the image sensor,
wherein the drive module is electrically connected with the liquid crystal lens array, and
wherein the drive module is configured to adjust, based on a distance between each object to be captured and a respective liquid crystal sub-lens, a focus of the liquid crystal sub-lens during capturing, such that light rays from each object to be captured are focused respectively in a plane where the image sensor is located after passing through the respective liquid crystal sub-lens,
the method comprising the steps of:
during capturing, adjusting, by the drive module, based on a distance between each object to be captured and a respective liquid crystal sub-lens, a focus of the liquid crystal sub-lens such that light rays from each object to be capture are focused respectively in a plane where the image sensor is located after passing through the respective liquid crystal sub-lens.

* * * * *